Aug. 13, 1940. F. T. HARRINGTON Re. 21,529

POWER TRANSMISSION

Original Filed Nov. 16, 1937

INVENTOR
FERRIS T. HARRINGTON
BY Ralph L. Trimble
ATTORNEY

Reissued Aug. 13, 1940

Re. 21,529

UNITED STATES PATENT OFFICE 21,529

POWER TRANSMISSION

Ferris T. Harrington, Detroit, Mich., assignor to Vickers, Incorporated, Detroit, Mich., a corporation of Michigan Original No. 2,184,670, dated December 26, 1939, Serial No. 174,858, November 16, 1937. Application for reissue January 29, 1940, Serial No. 316,240

11 Claims. (Cl. 50—12)

Figure 1:
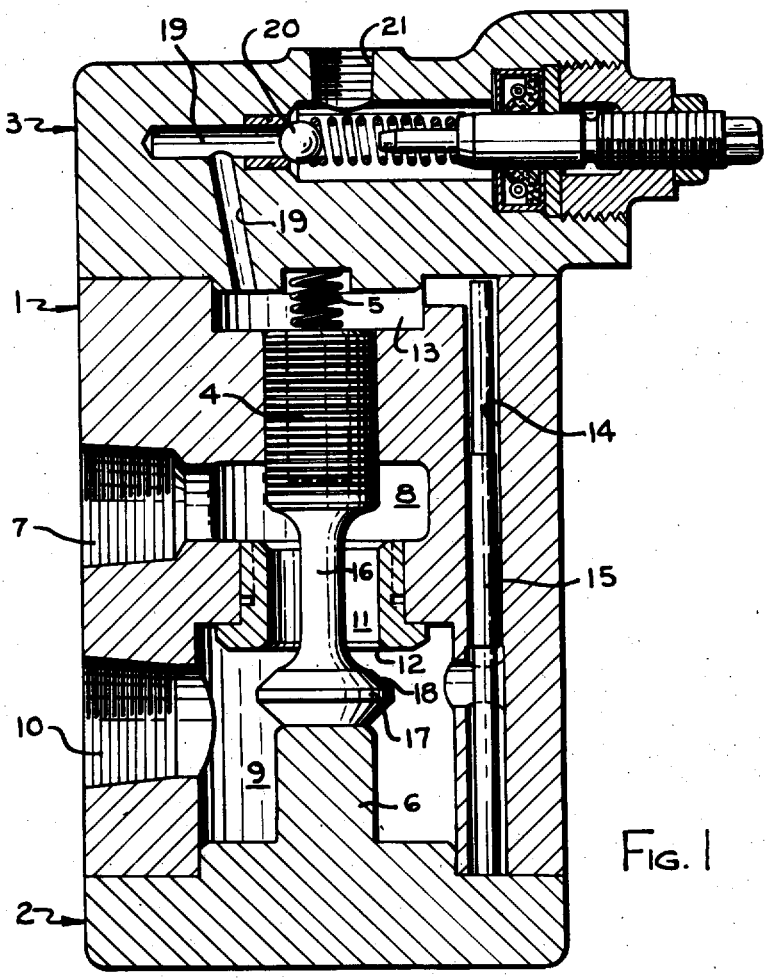

This invention relates to a reducing valve and has particularly to do with a reducing valve which is provided with fluid pressure adjustment.

In conventional practice it has been customary to provide spring backed reducing valves. This has necessitated fairly large springs to back the piston valve and has resulted in not only a larger valve housing but in a valve which was quite subject to chattering action. Because of this chattering action it has been impossible to design a reducing valve which was capable of accurate adjustment and regulation.

The object of the present invention is to provide a reducing valve in which a comparatively light spring may be used and in which the overall size may be about one-third that of the ordinary reducing valve. A further object of the invention is to provide a reducing valve in which chattering has been eliminated and which provides a more closely defined pressure regulation.

Briefly this has been accomplished by establishing a pressure regulator chamber behind the valve piston and connecting this chamber through a restricted passageway with the low pressure chamber of the valve and also through an adjustable check valve to a tank outlet. By reason of a slight flow or leakage from the low pressure chamber through this restricted passageway to the pressure regulating chamber, the pressure in the low pressure chamber is not permitted to build up above an adjustment or setting of the check valve. The pressure in the regulating chamber also forms a load on the valve piston and this hydraulic load cooperates with the spring behind the piston to permit an accurate regulation of the reducing pressure.

In the drawing the single figure is a longitudinal cross-section through the valve housing, the fluid passageways being shown in one plane for purposes of illustration.

Referring to the drawing, there is shown an embodiment of the invention which has been selected for purposes of disclosure. This embodiment is composed of a main housing 1, an end cap 2 and a pressure control housing 3. The main housing 1 is provided with a longitudinal cylindrical recess in which is slidably disposed, a valve piston 4 which will later be described. A spring 5 seated in the housing 3 urges the valve piston 4 toward an abutment 6 on the end cap 2.

The housing 1 has a pressure inlet port 7 which enters the central piston recess in the housing and forms an annular port 8 around the piston 4. A pressure outlet chamber 9 bounded on one side by the end cap 2 is formed in the housing 1 and is open to a pressure outlet port 10. The port 8 and the chamber 9 communicate through a restriction or passageway 11 in the housing 1. This restriction forms a part of the recess for the valve piston 4 and also forms a valve seat 12 adapted to cooperate with a portion of the valve piston 4. The pressure outlet chamber 9 is connected to a balance chamber 13 through a passageway 14 in which is located a restriction pin 15, a portion of which has a cross section very slightly smaller than the passageway 14.

The valve piston 4 has a slender rod portion 16 adapted to be positioned substantially within the restriction 11 and at the end of which is a piston formation 17 having a diameter larger than that of the passage 11. This piston 17 has a beveled portion 18 adapted to close the valve seat 12 when in contact therewith. When in its open position the piston 17 is held against the abutment 6 by reason of the action of the spring 5.

The housing 3 has a passageway 19 which opens at one end to the balance chamber 13 in the housing 4 and which opens at the other end through a spring-pressed, adjustable check valve 20 to a tank outlet 21.

In the operation, the pressure in the balance chamber 13 is the same as that in the outlet chamber 9 and in the inlet recess 8 until the pressure exceeds the setting of the check valve 20. At this point the check valve bypasses a sufficient volume from the balance chamber 13 to cause a pressure drop. In view of the fact that the passageway 14 is restricted the pressure drop in the balance chamber 13 will permit the pressure acting on the piston 17 in the outlet chamber 9 to move the valve piston 4 against the spring 5 thereby closing the communicating passage or restriction 11 between the inlet recess 8 and the outlet chamber 9.

In the closed position the piston 4 is hydraulically balanced in the inlet recess 8 because of the fact that the seating area exposed in the communicating passage 11 is the same as the area of the piston plunger 4. The piston 4 is held in this closed or restricted position due to the pressure differential between the outlet chamber 9 and the balance chamber 13. When the pressure in the balance chamber 13 drops below the setting of the pressure control of the check valve 20, causing it to close, the fluid flows from outlet chamber 9 through the restricted passageway 14 and increases the pressure in the balance chamber 13 to that in the outlet chamber 9. Under these conditions the spring 5 returns the piston 4 to its open position since the working areas at each end of the piston are equal.

In the actual operation of the valve an equilibrium is established and there is an almost constant leakage from the low pressure chamber 9 through the restriction 15 to the regulating chamber 13. This slight leakage keeps the pressure from building up in chamber 9 and also forms a leakage load on the top of the piston 4. Any tendency for the pressure to build up in the chambers 9 and 13 above the setting of the check valve 20 is overcome by the opening of the check valve at which time the leakage load in the chamber 13 is slightly reduced to permit the piston 17 to close or partially close the passageway 11.

The pressure control valve 20 may be adjusted to open at any desired pressure. Thus, controlling of the pressure or leakage load in the balance chamber 13 will regulate the pressure maintained in the outlet chamber 9 regardless of the pressure in the inlet port 8. A smooth acting reducing valve is thereby provided. The amount of restriction in the passageway 14 will, of course, have to be regulated to correspond with the viscosity of the fluid normally used in the system.

What I claim is:

1. In an adjustable fluid pressure reducing valve, a housing provided with inlet and outlet chambers, a piston valve between said chambers, a relatively light spring tending normally to hold said valve open, said housing having a pressure chamber behind said valve and a restricted passageway independent of said piston valve between said outlet chamber and said pressure chamber, and a pressure relief valve connecting said pressure chamber with a tank outlet.

2. In an adjustable fluid pressure reducing valve, a housing provided with inlet and outlet chambers, a piston valve between said chambers, means tending normally to hold said valve open, said housing having a pressure chamber behind said valve and a restricted passageway independent of said piston valve between said outlet chamber and said pressure chamber, and a pressure relief valve connecting said pressure chamber with a tank outlet.

3. In an adjustable fluid pressure reducing valve of the type having a closely fitted spring pressed piston and the usual inlet and outlet chambers, an additional housing providing a pressure chamber behind the piston and a restricted passageway between the outlet chamber and said pressure chamber, and a relief valve in a passageway leading from said pressure chamber to a tank outlet and adapted to open at a predetermined pressure whereby a predetermined pressure may be maintained in said outlet chamber irrespective of changes in said inlet chamber.

4. In an adjustable fluid pressure reducing valve of the type having a housing and a closely fitted spring pressed piston and the usual inlet and outlet chambers, an additional housing portion providing a pressure chamber on the spring side of the piston and a restricted passageway between the outlet chamber and said pressure chamber, and an adjustable pressure actuated relief valve opening from said pressure chamber to a tank outlet.

5. An adjustable fluid pressure reducing valve comprising housing portions having an inlet chamber, an outlet chamber connected therewith, a pressure regulating chamber, and a restricted passageway between said last two chambers, a valve piston slidably disposed in said housing and adapted, in one position, to close the inlet and outlet chambers from each other, a relatively light spring acting normally to hold said valve piston open, and an adjustable, spring pressed relief valve opening from said pressure regulator chamber to a tank outlet whereby a predetermined pressure may be maintained in said outlet chamber.

6. An adjustable fluid pressure reducing valve comprising housing portions having an inlet chamber, an outlet chamber connected therewith, a pressure regulating chamber, and a restricted passageway between said last two chambers, a valve piston slidably disposed in said housing and adapted, in one position, to close the inlet and outlet chambers from each other, a relatively light spring positioned in said pressure regulator chamber and acting on said piston to open said valve, and an adjustable, spring pressed relief valve opening from said pressure regulator chamber to a tank outlet whereby a predetermined reduced pressure may be maintained in said outlet chamber irrespective of pressure changes in said inlet chamber.

7. In an adjustable fluid pressure reducing valve of the type having a closely fitted spring pressed piston and the usual low pressure and high pressure chambers, an additional housing providing a regulating pressure chamber behind the piston and a passageway between the low pressure chamber and said regulating pressure chamber, a restriction in said passageway and a relief valve opening from said pressure chamber to a tank outlet whereby the control unit utilizes the leak from the low pressure chamber to keep pressure from building up therein.

8. In an adjustable fluid pressure reducing valve of the type having a closely fitted spring pressed piston and the usual low pressure and high pressure chambers, an additional housing providing a regulating pressure chamber behind the piston and a passageway between the low pressure chamber and said regulating pressure chamber, a restriction in said passageway and a relief valve opening from said pressure chamber to a tank outlet whereby the control unit utilizes the leak from the low pressure chamber to keep pressure from building up therein and to form a controlled hydraulic load for governing the reduced pressure.

9. In an adjustable fluid pressure reducing valve of the type having a closely fitted spring pressed, substantially balanced piston and the usual low pressure and high pressure chambers, an additional housing providing a regulating pressure chamber behind the piston and a passageway between the low pressure chamber and said regulating pressure chamber, a relief valve opening from said pressure chamber to a tank outlet, and a restriction in said passageway to utilize the leak from the low pressure chamber to form a controlled hydraulic load on said piston for governing the reduced pressure whereby a constant predetermined reduced pressure may be maintained in said low pressure chamber irrespective of changes in said high pressure chamber.

10. In an adjustable fluid pressure reducing valve, a housing provided with inlet and outlet chambers, a piston valve between said chambers, a relatively light spring tending normally to hold the valve open, said housing having a pressure chamber behind said valve, a passageway, independent of said piston valve, between the outlet chamber and the pressure chamber, an exhaust passageway from the pressure chamber, a choke in one of said passageways, and a pressure responsive relief valve in the other passageway.

11. In an adjustable fluid pressure reducing valve, a housing provided with inlet and outlet chambers, a piston valve between said chambers, means biasing the valve in one direction, said housing having a pressure chamber for controlling the degree of opening of the valve, a passageway, independent of said piston valve, between the outlet chamber and the pressure chamber, an exhaust passageway from the pressure chamber, a choke in one of said passageways, and a pressure responsive relief valve in the other passageway.

FERRIS T. HARRINGTON.